US006444741B1

(12) United States Patent
Chen et al.

(10) Patent No.: US 6,444,741 B1
(45) Date of Patent: Sep. 3, 2002

(54) METHOD OF PREPARING THERMOPLASTIC RANDOM COPOLYMER COMPOSITION CONTAINING ZINC OXIDE AND AMINOSILOXANE

(75) Inventors: Jiann H. Chen, Fairport; Joseph A. Pavlisko, Pittsford; Charles C. Anderson, Penfield; Muhammed Aslam, Rochester, all of NY (US)

(73) Assignee: NexPress Solutions LLC, Rochester, NY (US)

( * ) Notice: Subject to any disclaimer, the term of this patent is extended or adjusted under 35 U.S.C. 154(b) by 132 days.

(21) Appl. No.: 09/607,731

(22) Filed: Jun. 30, 2000

(51) Int. Cl.⁷ .................................................. C08J 3/28
(52) U.S. Cl. ........................ 524/428; 524/432; 524/714; 526/291
(58) Field of Search ................................ 524/432, 428, 524/714; 526/291; 525/326.2, 330.7, 100

(56) References Cited

U.S. PATENT DOCUMENTS

| | | | |
|---|---|---|---|
| 4,272,179 A | 6/1981 | Seanor | 355/3 FU |
| 4,373,239 A | 2/1983 | Henry et al. | 29/132 |
| 4,430,406 A | 2/1984 | Newkirk et al. | 430/99 |
| 4,518,655 A | 5/1985 | Henry et al. | 428/329 |
| 4,568,275 A | 2/1986 | Sakurai | 432/60 |
| 4,853,737 A | 8/1989 | Hartley et al. | 355/289 |
| 4,970,098 A | 11/1990 | Ayala-Esquilin et al. | 428/36.4 |
| 4,999,221 A | 3/1991 | Eigenbrod et al. | 427/195 |
| 5,157,445 A | 10/1992 | Shoji et al. | 355/284 |
| 5,253,027 A | 10/1993 | Goto | 355/290 |
| 5,269,740 A | 12/1993 | Fitzgerald et al. | 492/56 |
| 5,292,562 A | 3/1994 | Fitzgerald et al. | 428/35.8 |
| 5,292,606 A | 3/1994 | Fitzgerald | 428/35.8 |
| 5,336,539 A | 8/1994 | Fitzgerald | 428/36.8 |
| 5,464,698 A | 11/1995 | Chen et al. | 428/421 |
| 5,464,703 A | 11/1995 | Ferrar et al. | 428/421 |
| 5,466,533 A | 11/1995 | Fitzgerald et al. | 428/477 |
| 5,474,821 A | 12/1995 | Kass | 428/35.8 |
| 5,474,852 A | 12/1995 | Fitzgerald et al. | 428/447 |
| 5,480,724 A | 1/1996 | Fitzgerald et al. | 428/477 |
| 5,480,930 A * | 1/1996 | Gentle et al. | 524/414 |
| 5,534,347 A * | 7/1996 | Chen et al. | 428/375 |
| 5,547,759 A | 8/1996 | Chen et al. | 428/421 |
| 5,582,917 A | 12/1996 | Chen et al. | 428/421 |
| 5,595,823 A | 1/1997 | Chen et al. | 428/421 |
| 5,599,631 A | 2/1997 | Chen et al. | 428/421 |
| 5,736,250 A | 4/1998 | Heeks et al. | |
| 5,919,886 A | 7/1999 | Matsuda et al. | 525/276 |
| 5,948,479 A | 9/1999 | Adam et al. | 427/388.4 |
| 6,020,450 A | 2/2000 | Matsuda et al. | 528/42 |
| 6,035,780 A | 3/2000 | Badesha et al. | 101/217 |
| 6,041,210 A | 3/2000 | Chen et al. | 399/333 |
| 6,068,931 A | 5/2000 | Adam et al. | 428/469 |

FOREIGN PATENT DOCUMENTS

| | | |
|---|---|---|
| EP | 0 344 481 A2 | 12/1989 |
| EP | 0 485 906 A2 | 5/1992 |
| EP | 0 544 265 A1 | 6/1993 |
| EP | 0 987 298 A1 | 3/2000 |

OTHER PUBLICATIONS

"Segmented Organosiloxane Copolymers", Polymer, 1984, v. 25, pp1800–1806, by Yilgor et al.

"THV Fluoroplastic" by D.E. Hull, B.V. Johnson, I.P. Rodricks and J.B. Staley, Modern Fluorpolymers, edited by John Scheirs, 1997.

"Encyclopedia of Polymer Science and Engineering", vol. 17, pps 829–835 on Thermoplastics and Fluoroplastics (J. Wiley & Sons 1989).

"Encyclopedia of Polymer Science and Engineering", vol. 7, pps 257–269 on Fluorocarbon Elastomers (J. Wiley & Sons 1987).

Kirk–Othmer "Encyclopedia of Chemical Technology", vol. 8, pps 990–1005 on Fluorocarbon Elastomers (J. Wiley & Sons 1993).

* cited by examiner

Primary Examiner—David W. Wu
Assistant Examiner—William K. Cheung

(57) ABSTRACT

A method of preparing a composition containing a fluorocarbon thermoplastic random copolymer comprising the steps of:
(a) providing a mixture having:
  (i) a fluorocarbon thermoplastic random copolymer having subunits of:

—($CH_2CF_2$)x—, —($CF_2CF(CF_3)$)y—, and —($CF_2CF_2$)z—, wherein
  x is from 1 to 50 or 60 to 80 mole percent,
  y is from 10 to 90 mole percent.
  z is from 10 to 90 mole percent.
  x+y+z equals 100 mole percent;
  (ii) a filler comprising zinc oxide;
  (iii) a curable amino functional polydimethyl siloxaie copolymer comprising aminofunctional units selected from tile group consisting of (aminoethylaminopropyl) methyl, ( aminopropyl) methyl and (aminopropyl) dimethyl; and
  (iv) a bisphenol residue curing agent; and
(b) curing the mixture for 3 to 10 hours at a temperature in the range of 220° C. to 280° C. and for an additional 2 to 10 hours at a temperature in the range of 250° C. to 270° C.

19 Claims, No Drawings

METHOD OF PREPARING THERMOPLASTIC RANDOM COPOLYMER COMPOSITION CONTAINING ZINC OXIDE AND AMINOSILOXANE

CROSS REFERENCE TO RELATED APPLICATIONS

This application relates to the following commonly assigned copending applications: U.S Ser. No. 09/609,561 abandoned of Chen et al, titled "Fluorocarbon Thermoplastic Random Copolymer Composition", U.S. Ser. No. 09/608, 290, pending of Chen et al, titled "Fuser Member With Fluorocarbon Thermoplastics Coating", and U.S. Ser. No. 09/607,418 U.S. Pat. No. 6,361, 829 Mar. 26, 2002 of Chen et al, titled "Method of Coating Fuser Member with Thermoplastic Containing Zinc Oxide and Aminosiloxane", all of which are filed simultaneously herewith.

FIELD OF THE INVENTION

This invention relates to a method of preparing compositions containing a fluorocarbon thermoplastic random copolymer. More particularly, the invention relates to a method of preparing compositions containing a fluorocarbon thermoplastic random copolymer, zinc oxide, and an aminosiloxane. Such compositions are usefuil as coatings, sheets, or films where high temperature resistance is required.

BACKGROUND OF THE INVENTION

Fluororesins, including both fluorocarbon elastomers and fluorocarbon thermoplastics, are widely used in the form of sheet, film, coatings and laminates in various fields due to their characteristic properties such as good heat resistance, good chemical resistance and good weather resistance. These materials find applications as gaskets and seals in automotive fuel delivery, engine, and powertrain systems, tank and pipe liners, release layers on compression molds, layers on electrophotographic toner fuser rollers or belts, valve stem and rotating shaft sealant coatings, roller and bearing coatings, and sealants for porous materials such as ceramics and fabric, for example. In addition to their characteristic resistance to heat, chemicals, and weather, and depending upon the particular application these fluororesin compositions may also need to provide appropriate frictional characteristics, abrasion and wear resistance, flexibility, processability, and adhesion to a particular substrate.

Polyfluorocarbon elastomers, such as vinylidene fluoride-hexafluoropropylene copolymers, are tough, wear resistant and flexible elastomers that have excellent high temperature resistance, but relatively high surface energies, which compromise applications where release properties are critical, for example as release layers on compression molds or outer layers on electropbotographic toner fuser members.

Fluorocarbon resins like polytetrafluoroethylene (PTFE) or fluorinated ethylenepropylene (FEP) are fluorocarbon thermoplastics which have excellent release characteristics due to very low surface energy. Fluorocarbon thermoplastic resins are, however, less flexible and elastic than fluorocarbon elastomers and often require high temperature curing for long time periods to sinter the polymer into a continuous and useful layer or sheet.

Both fluorocarbon elastomers and fluorocarbon thermoplastics have been used to prepare high temperature resistant surfaces. For example, U.S. Pat. No. 4,999,221 describes a process for powder coating a substrate with a fluoroplastic material to provide a heat resistant surface layer. U.S. Pat. Nos. 5,919,886 and 6,020,450 describe a room temperature curable fluoropolymer composition containing an organosilicon compound and a condensation accelerator having improved heat resistance and weatherability.

U.S. Pat. Nos. 5,948,479 and 6,068,931 describe composite materials for self-lubricating slide bearings containing a fluoro thermoplastic composite overlayer on a porous metal bearing.

Fluororesin-containing compositions have also been successfully employed in various electrostatographic applications. For example, U.S. Pat. Nos. 4,568,275 and 5,599,631 disclose a fuser roll having a layer of fluorocarbon elastomer and a fluorinated resin powder. However, the fluorocarbon resin tends to phase separate from the fluorocarbon elastomer thereby diminishing performance. U.S. Pat. No. 4,853,737 discloses a fuser roll having an outer layer comprising cured fluorocarbon elastomers containing pendant amine functional polydimethylsiloxane that are covalently bonded to the backbone of the fluorocarbon elastomer. However, the amine functional polydimethylsiloxane tends to phase separate from the fluorocarbon elastomer.

U.S. Pat. No. 5,582,917 discloses a fuser roll having a surface layer comprising a fluorocarbon-silicone polymeric composition obtained by heating a fluorocarbon elastomer with a fluorocarbon elastomer curing agent in the presence of a curable polyfunctional poly(C1–6 alkyl) siloxane polymer. However, the resulting interpenetrating network (IPN) has relatively high coefficient of friction and relatively low mechanical strength. After a period of use, the release property of the roller degrades and paper jams begin to occur.

U.S. Pat. No. 5,547,759 discloses a fuser roll having a release coating layer comprising an outermost layer of fluorocarbon resin uniquely bonded to a fluoroelastomer layer by means of a fluoropolymer containing a polyamide-imide primer layer. Although the release coating layer has relatively low surface energy and good mechanical strength, the release coating layer lacks flexibility and elastic properties and can not produce high quality of images. In addition, sintering the fluorocarbon resin layer is usually accomplished by heating the coated fuser member to temperatures of approximately 350° C. to 400° C. Such high temperatures can have a detrimental effect on the substrate to which the fluorocarbon resin has been applied, especially, for example, if the substrate is a polymeric material. It would be desirable to provide a fluorocarbon composition that can be formed and/or cured without damaging the substrate to which it has been applied.

U.S. Pat. No. 5,595,823 discloses toner fusing members which have a substrate coated with a fluorocarbon random copolymer containing aluminum oxide. Although these toner fusing members have proved effective and have desirable thermal conductivity, they have a problem in that there can be toner contamination. The advantage of using the cured fluorocarbon thermoplastic random copolymer compositions is that they are effective for use with toner release agents which typically include silicone.

U.S. Pat. No. 6,035,780 describes a process to prepare a compatibilized blend of a fluoroelastomer and a polysiloxane useful for electrostatographic and liquid ink printing machine applications. The compatible blend is reportedly useful as a component of long-life fuser rolls, backing rolls, transfer and transfuse belts and rolls and bias charging and bias transfer rolls.

As evidenced by the above description, fluororesin compositions have been widely utilized in a variety of critical applications requiring resistance to severe or aggressive environments, abrasion and wear resistance, surface lubricity, and release properties. However, it has been extremely difficult to provide a fluororesin composition which simultaneously provides most or all of these characteristics and yet is easily prepared using shorter curing times and lower temperatures. It is toward a solution to this problem that the present invention is directed.

SUMMARY OF THE INVENTION

The present invention provides a method of preparing a composition containing a fluorocarbon thermoplastic random copolymer that is easily processed into a coating or sheet having improved release properties, surface lubricity and mechanical strength. The method comprises the steps of:
(a) providing a mixture having:
(i) a fluorocarbon thermoplastic random copolymer having subunits of:

—(CH$_2$CF$_2$)x—, —(CF$_2$CF(CF$_3$)y—, and —(CF$_2$CF$_2$)z—, wherein
x is from 1 to 50 or 60 to 80 mole percent,
y is from 10 to 90 mole percent,
z is from 10 to 90 mole percent, and
x+y+z equals 100 mole percent.
(ii) a filler comprising zinc oxide;
(iii) a curable amino functional polydimethyl siloxane copolymer comprising aminofunctional units selected from the group consisting of (aminoethylaminopropyl) methyl, (aminopropyl) methyl and (aminopropyl) dimethyl; and
(iv) a bisphenol residue curing agent; and
(b) curing the mixture for 3 to 10 hours at a temperature in the range of 220° C. to 280° C. and for an additional 2 to 10 hours at a temperature in the range of 250° C. to 270° C.

The compositions prepared as described above are suitable for use as a coating on a variety of substrates or as a free standing slab or film. The coatings may be applied to substrates such as metals, polymers, ceramics, or glass. The substrate may be in essentially any form or shape, for example, a sheet, a web, a roller, a machined part, etc. When applied to a substrate, the compositions are coated from an organic solvent, then dried at ambient or elevated temperature, and then cured as described above. Hence, the invention also provides a method of preparing a coating composition for a substrate comprising the steps of:
a) providing a composition having:
(i) a fluorocarbon thermoplastic random copolymer having subunits of:

—(CH$_2$CF$_2$)x—, —(CF$_2$CF(CF$_3$)y—, and —(CF$_2$CF$_2$)z—, wherein
x is from 1 to 50 or 60 to 80 mole percent.
y is from 10 to 90 mole percent,
z is from 10 to 90 mole percent, and
x+y+z equals 100 mole percent;
ii) a filler comprising zinc oxide;
iii) a curable amino functional polydimethyl siloxane copolymer comprising aminofunctional units selected from the group consisting of (aminoethylaminopropyl) methyl, (aminopropyl) methyl and (aminopropyl) dimethyl; and
iv) a bisphenol residue curing agent;
b) providing a substrate;

c) coating the substrate with the composition in an organic solvent;
d) allowing the composition to dry on the substrate at ambient or elevated temperatures; and
e) curing the mixture for 3 to 10 hours at a temperature in the range of 220° C. to 280° C. and for an additional 2 to 10 hours at a temperature in the range of 250° C. to 270° C.

The composition may also be cured for 3 to 6 hours at a temperature in the range of 220° C. to 280° C. and for an additional 2 to 6 hours at a temperature in the range of 250° C. to 270° C. Alternatively, the composition may be cured for 3 to 6 hours at a temperature in the range of 220° C. to 270° C. and for an additional 2 to 6 hours at a temperature in the range of 250° C. to 260° C. Preferably, the composition is cured for 3 hours at a temperature of 270° C. and for an additional 2 hours at a temperature of 260° C.

The aminosiloxane is an amino functional polydimethyl siloxane copolymer comprising aminofunctional units selected from the group consisting of (aminoethylaminopropyl) methyl, (aminopropyl) methyl and (aminopropyl) dimethyl.

Optionally, the composition of the invention may further contain a fluorinated resin selected from the group of polytetrafluoroethylene or fluoroethylenepropylene having a number average molecular weight of between 50,000 and 50,000,000.

As will be demonstrated through examples, compositions comprising unfilled fluorocarbon thermoplastic random copolymer have poor mechanical strength and release properties. However, it has been surprisingly found in the present invention that the addition of zinc oxide filler and an aminosiloxane polymer to a fluorocarbon, thermoplastic random copolymer provides a composition having improved mechanical strength and release properties. It was particularly surprising that these fluorocarbon thermoplastic random copolymers which are known to have low processing temperatures would yield compositions that have excellent mechanical properties for use in a high temperature applications.

Curing of the fluorocarbon thermoplastic random copolymer is carried out at much shorter curing cycles compared to the well known conditions for curing vinylidene fluoride based fluorocarbon elastomer copolymers. Curing of the fluorocarbon thermoplastic random copolymer compositions of the current invention is as short as 3 hours at a temperature of 220° C. to 280° C. and an additional 2 hours at a temperature of 250° C. to 270° C.

A further advantage of the present invention is that the addition of specific release additives such as fluorinated resins in the presence of a bisphenol residue curing agent significantly improves the frictional characteristics of the fluorocarbon thermoplastic random copolymer-containing compositions.

DETAILED DESCRIPTION OF PARTICULAR EMBODIMENTS

The compositions of the invention contain a fluorocarbon thermoplastic random copolymer that is cured by a curing agent. The fluorocarbon random copolymer has subunits of:

—(CH$_2$CF$_2$)x—, —(CF$_2$CF(CF$_3$)y—, and —(CF$_2$CF$_2$)z—, wherein
x is from 1 to 50 or 60 to 80 mole percent,
y is from 10 to 90 mole percent,
is from 10 to 90 mole percent, and x+y+z equal 100 mole percent.

—(CH$_2$CF$_2$) is (vinylidene fluoride subunit ("VF$_2$")),
—(CF$_2$CF(CF$_3$) is (hexafluoropropylene subunit ("HFP")), and
—(CF$_2$CF$_2$) is (tetrafluoroethylene subunit ("TFE")).

The curing agent has a bisphenol residue. By the term bisphenol residue is meant bisphenol or a derivative such as bisphenol AF.

The composition further includes a particulate filler having zinc oxide, and an aminosiloxane.

The aminosiloxane is an amino functional polydimethyl siloxane copolymer comprising aminofunctional units selected from the group consisting of (aminoethylaminopropyl) methyl, (aminopropyl) methyl and (aminopropyl) dimethyl.

In these formulas, x, y, and z are mole percentages of the individual subunits relative to a total of the three subunits (x+y+z), referred to herein as "subunit mole percentages". The curing agent can be considered to provide an additional "cure-site subunit", however, the contribution of these cure-site subunits is not considered in subunit mole percentages. In the fluorocarbon thermoplastic copolymer, x has a subunit mole percentage of from 1 to 50 or 60 to 80 mole percent, y has a subunit mole percentage of from 10 to 90 mole percent, and z has a subunit mole percentage of from 10 to 90 mole percent. In a currently preferred embodiment of the invention, subunit mole percentages are: x is from 30 to 50 or 70 to 80, y is from 10 to 20, and z is from 10 to 50; or more preferably x is from 40 to 50, y is from 10 to 15, and z is 40 to 50. In the currently preferred embodiments of the invention, x, y, and z are selected such that fluorine atoms represent at least 65 percent of the total formula weight of the VF$_2$, HFP, and TFE subunits.

A curable amino functional polydimethyl siloxane copolymer is used in the present invention and is cured with the fluorocarbon thermoplastic random copolymer to produce a material suitable for use in a variety of applications including seals and gaskets, heat resistant coatings for belts, rollers, and bearings, release layers for compression molds and electrostatographic fuser members, etc.

An optional release additive such as a fluorinated resin can be added to the fluorocarbon thermoplastic random copolymer-containing compositions to further improve the surface lubricity of the compositions.

The conditions employed for curing are largely determined by the particular application for the cured fluorocarbon thermoplastic random copolymer-containing composition. For example, when the compositions are prepared as a slab or free standing film, higher temperatures and longer curing times may be employed. When the compositions are applied as a coating on a substrate, particularly polymeric substrates, lower curing temperatures and shorter curing times may be more appropriate. In a preferred embodiment, the substrate is either a metal or a ceramic, and the fluorocarbon thermoplastic random copolymer-containing mixtures are cured for 3–6 hours at a temperature of 220° to 280° C. and an additional 2 to 6 hours at 250° C. to 270° C. In another preferred embodiment, the substrate is either a metal or a ceramic, and the fluorocarbon thermoplastic random copolymer-containing mixtures are cured for 3–6 hours at a temperature of 220° C. to 250° C. and an additional 2 to 6 hours at 250° C. to 260° C.

A preferred class of curable amino functional polydimethyl siloxanes, based on availability, includes those having functional groups such as aminopropyl or aminoethylaminopropyl pendant from the siloxane backbone such as DMS-A11, DMS-A12, DMS-A15, DMS-A21 and DMS-A32 (sold by Gelest, Inc.) having a number average molecular weight between 850 and 27,000. Particularly preferred curable amino functional polydimethyl siloxanes are bis (aminopropyl) terminated poly(dimethylsiloxane). Such oligomers are available in a series of molecular weights as disclosed, for example, by Yilgor et al., "Segmented Organosiloxane Copolymer", Polymer,1984, V.25, pp1800–1806. Other curable amino functional polydimethyl siloxanes which can be used are disclosed in U.S. Pat. Nos. 4,853,737 and 5,157,445, the disclosures of which are hereby incorporated by reference.

Preferred compositions of the invention have a ratio of aminosiloxane polymer to fluorocarbon thermoplastic random copolymer between about 0.01 and 0.2 to 1 by weight, preferably between about 0.05 and 0.15 to 1. The composition is preferably obtained by curing a mixture comprising from about 60–90 weight percent of a fluorocarbon thermoplastic copolymer, 5–20 weight percent, most preferably about 5–10 weight percent, of a curable amino functional polydimethyl siloxane copolymer, 1–5 weight percent of a bisphenol residue, 1–20 weight percent of a zinc oxide acid acceptor type filler, and 10–50 weight percent of a fluorinated resin.

The compositions of the invention include a particulate filler comprising zinc oxide. The zinc oxide particles can be obtained from a convenient commercial source, e.g., Atlantic Equipment Engineers of Bergenfield, N.J. In a currently preferred embodiment, the particulate zinc oxide filler has a total concentration in the compositions of the invention of from about 1 to 20 parts per hundred parts by weight of the fluorocarbon thermoplastic random copolymer (pph). Concentrations of zinc oxide much greater than 20 parts by weight will render the composition to stiff. In a particular embodiment of the invention, the composition has 3 to 15 pph of zinc oxide.

The particle size of the zinc oxide filler does not appear to be critical. Particle sizes anywhere in the range of 0.1 to 100 micrometers have been found to be acceptable. In the examples presented below the zinc oxide particles were from 1 to 40 micrometers in diameter.

To prepare the compositions of the invention, the filler particles are mixed with the uncured fluorocarbon thermoplastic random copolymer, aminosiloxane, a bisphenol residue curing agent, and any other additives, such as fluorinated resin, and cured. The fluorocarbon thermoplastic random copolymer is cured by crosslinking with basic nucleophile addition curing. Basic nucleophilic cure systems are well known and are discussed, for example, in U.S. Pat. No. 4,272,179. One example of such a cure system combines a bisphenol as the curing agent and an organophosphonium salt, as an accelerator. The fluorinated resins which include polyterafluoroethylene (PTFE) or fluoethylenepropylene (FEP) are commercially available from duPont.

The curing agent is incorporated into the polymer as a cure-site subunit, for example, bisphenol residues. Other examples of nucleophilic addition cure systems are sold commercially as DIAK No. I (hexamethylenediamine carbamate) and DIAK No. 3 (N,N'-dicinnamylidene-1,6-hexanediamine) by duPont.

Suitable fluorocarbon thermoplastic random copolymers are available commercially. In a particular embodiment of the invention, a vinylidene fluoride-co-tetrafluoroethylene co-hexafluoropropylene was used which can be represented as—(VF)(75)—(TFE) (10) —(HFP)(25)—. This material is marketed by Hoechst Company under the designation "THV Fluoroplastics" and is referred to herein as "THV". In another embodiment of the invention, a vinylidene fluorideco-tetrafluoroethylene-co-hexafluoropropylene was used which can be represented as—(VF)(49)—(TFE) (41)—(HFP)(10)—. This material is marketed by Minnesota Mining and Manufacturing, St. Paul, Minn., under the designation "3M THV" and is referred to herein as "THV-200A". Other suitable uncured vinylidene fluoride-cohexafluoropropylenes and vinylidene fluoride-co-tetrafluoroethylene-cohexafluoropropylenes are available, for example, THV-400, THV-500 and THV-300.

In general, THV Fluoroplastics are set apart from other melt-processable fluoroplastics by a combination of high flexibility and low process temperatures. With flexural modulus values between 83 Mpa and 207Mpa, THV Fluoroplastics are the most flexible of the fluoroplastics.

The molecular weight of the uncured polymer is largely a matter of convenience, however, an excessively large or excessively small molecular weight would create problems, the nature of which are well known to those skilled in the art. In a preferred embodiment of the invention the uncured polymer has a number average molecular weight in the range of about 100,000 to 200,000.

Curing of the fluorocarbon thermoplastic random copolymer is carried out at much shorter curing cycles compared to the well known conditions for curing vinylidene fluoride based fluorocarbon elastomer copolymers. For example, the cure of fluorocarbon elastomers is usually for 12–48 hours at temperatures of about 220° to 250° C. Typically, fluorocarbon elastomer coating compositions are dried until solvent free at room temperature, then gradually heated to about 230° C. over 24 hours, then maintained at that temperature for 24 hours. By contrast, the cure of the fluorocarbon thermoplastic random copolymer compositions of the current invention may be as brief as 3 hours at a temperature of 220° C. to 280° C. and an additional 2 hours at a temperature of 250° C. to 270° C.

In the practice of the present invention, a method of preparing a composition containing a fluorocarbon thermoplastic random copolymer comprises the steps of:

(a) providing a mixture having:
  (i) a fluorocarbon thermoplastic random copolymer having subunits of:

—(CH$_2$CF$_2$)x—, —(CF$_2$CF(CF$_3$)y—, and —(CF$_2$CF$_2$)z—, wherein
  x is from 1 to 50 or 60 to 80 mole percent,
  y is from 10 to 90 mole percent,
  z is from 10 to 90 mole percent, and
  x+y+z equals 100 mole percent;
  (ii) a filler comprising zinc oxide;
  (iii) a curable amino functional polydirmethyl siloxane copolymer comprising aminofunctional units selected from the group consisting of (aminoethylaminooropyl) methyl. (aminopropyl) methyl and (aminopropyl) dimethyl; and
  (iv) a bisphenol residue curing agent; and
(b) curing the mixture for 3 to 10 hours at a temperature in the range of 220° C. to 280° C. and for an additional 2 to 10 hours at a temperature in the range of 250° C. to 270° C.

The compositions prepared as described above are suitable for use as a coating on a variety of substrates or as a free standing slab or film. The coatings may be applied to substrates such as metals, polymers, ceramics, or glass. The substrate may be in essentially any form or shape, for example, a sheet, a web, a roller, a machined part, etc.

The conditions employed for curing are largely determined by the particular application for the cured fluorocarbon thermoplastic random copolymer-containing composition. For example, when the compositions are prepared as a slab or free standing film, higher temperatures and longer curing times may be employed. When the compositions are applied as a coating on a substrate, particularly polymeric substrates, lower curing temperatures and shorter curing times may be more appropriate. In a preferred embodiment, the fluorocarbon thermoplastic random copolymer-containing mixtures are cured for 3–6 hours at a temperature of 220 to 280° C. and an additional 2 to 6 hours at 250 to 270° C. In another preferred embodiment, the fluorocarbon thermoplastic random copolymer-containing mixtures are cured for 3 to 6 hours at a temperature of 220° to 270° C. and an additional 2 to 6 hours at 250 to 260° C. In a most preferred embodiment, the fluorocarbon thermoplastic random copolymer-containing mixtures are cured for 3 hours at 270° C. and an additional 2 hours at 260° C.

The invention is further illustrated by the following Examples and Comparative Examples.

EXAMPLES 1–3

A stainless steel substrate was cleaned with dichloromethane and dried. The substrate was then primed with a uniform coat of a metal alkoxide type primer, Dow 1200 RTV Prime Coat primer, marketed by Dow Corning Corporation of Midland, Mich.; which contains: light aliphatic petroleum naptha (85 weight percent), tetra (2-methoxyethoxy)-silane (5 weight percent), tetrapropyl orthosilicate (5 weight percent), and tetrabutyl titanate (5 weight percent). Silastic J RTV room temperature vulcanizing silicone rubber, marketed by Dow Corning Corporation of Midland, Mich.; was then mixed with a catalyst and applied onto the stainless steel substrate and cured at 230° C. for 2 hours under 75 tons/inch$^2$ of pressure. The coated substrate was then removed from the mold and baked in a convection oven with a temperature ramp increasing to 230° C. substantially uniformly over 24 hours and then maintaining that temperature for an additional 24 hours. After air cooling, EC4952 marketed by Emerson Cumming Division of W. R. Grace and Co. of Connecticut was blade coated directly onto the Silastic J layer, then cured for 12 hours at about 210° C., followed by 48 hours at 218° C. in a convection oven. After air cooling, the EC4952 was ground to a thickness of 20 mils. The cured EC4952 was corona discharge treated for 15 minutes at 750 watts and an outer layer containing the compositions of the invention were applied.

Fluorocarbon thermoplastic random copolymer THV 200A, zinc oxide, and aminosiloxane were mixed as indicated (amounts listed as parts per hundred) in Table 1 with varying amounts of fluorinated resin. THV200A is a commercially available fluorocarbon thermoplastic random copolymer which is sold by 3M Corporation. The zinc oxide particles can be obtained from convenient commercial source, e.g., Atlantic Equipment Engineers of Bergenfield, N.J. The amino siloxane DMS-A21 is commercially available from Gelest, Inc. The fluorinated resin which included polyterafluoroethylene (PTFE) or fluoethylenepropylene (FEP) is commercially available from duPont. Column 5 of Table 1 sets forth the parts per hundred (pph) of the fluorinated resin. The weight fractions of fluorocarbon thermoplastic random copolymer, zinc oxide and aminosiloxane were held constant. Each of the formulations were mixed with 3 grams of curative 50 (products made by the dupont). The formulations were all mixed on a two-roll mill then dissolved to form a 25 weight percent solids solution in methyl ethyl ketone. Part of the resulting solution was ring coated onto the cured EC4952 layer, air dried for 16 hours, baked with 2.5 hour ramp to 275° C., given a 30 minutes soak at 275° C., then held 2 hours at 260° C. The resulting layer of fluorocarbon random copolymer had a thickness of 1 mil. The remainder of the solution was cast to a film and allowed to dry for 3 days. Afterwards the cast films were baked with the same procedures described above.

Comparative Examples 1–5

Substantially the same procedures were followed as in Example 1–3, with the following exceptions as indicated in the compositions (amounts listed as parts per hundred) listed in Table 2. Comparative Examples 1 and 2 did not contain zinc oxide or the fluorinated resin. Comparative Example 2 was cured by Corona Discharge Treatment. For Comparative Examples 3 to 5 the THV 200A fluoroplastic was replaced with Viton A fluoroelastomer (dupont) and in Comparative examples 4 and 5 the mixture also included SFR-100 silicone. A mixture of zinc oxide and iron oxide was also included in Comparative Example 5. SFR-100 silicone is sold by General Electric Co. and the iron oxide used can be obtained from Atlantic Engineering of Bergenfield, N.J.

TABLE 1

| Sample | THV 200A | ZnO | Aminosiloxane | Fluorinated resin |
|---|---|---|---|---|
| Example 1 | 100 | 6 | 14 | 30 PTFE |
| Example 2 | 100 | 6 | 14 | 40 PTFE |
| Example 3 | 100 | 6 | 14 | 40 FEP |
| Comparative Example 1 | 100 | 0 | 14 | 0 |
| Comparative Example 2 | 100 | 0 | 14 | 0 |

TABLE 2

| Sample | Viton A | SFR-100 | ZnO: Fe2O3 |
|---|---|---|---|
| Comparative Example 3 | 100 | 0 | 0/0 |
| Comparative Example 4 | 100 | 20 | 0/0 |
| Comparative Example 5 | 100 | 20 | 10/10 |

DMA Testing Method

The samples were tested on a Rheometrics RSA II Dynamic Mechanical Analyzer (DMA) and required a sample geometry of 7.5 mm×23 mm with a thickness between 30 microns to 2000 microns. The free standing films were tested at 10 Hz and a strain of 0.07%. The test was recorded over a temperature scan of −100° C. to 200° C. Over the temperature scan an oscillatory strain is applied to the sample and the resulting stress is measured. These values are related to material properties by E' and E" (Storage and Loss Moduli, respectively). As a result of DMA testing, the storage modulus (E') at three different temperatures is determined and the behavior of the material at high temperature is observed.

TABLE 3

| | Storage Modulus Versus Temperature | | |
|---|---|---|---|
| Sample | MPa @ 80° C. | MPa @ 140° C. | MPa @ 175° C. |
| Example 1 | 10 | 8 | 8 |
| Comparative Example 1 | 30 | 0.1 | 0.05 |
| Comparative Example 2 | 30 | 0.1 | 0.05 |

Table 3 shows a comparison between the cured fluorocarbon thermoplastic random copolymer of Example 1 and the uncured fluorocarbon thermoplastic random copolymer of Comparative examples 1 and 2. The comparative examples, despite containing the bisphenol residue curing agent, did not cure because they did not contain the aluminum oxide filler which acts as an acid accelerator for curing. In terms of the modulus at 175° C., the cured fluorocarbon thermoplastic random copolymer provides a significant improvement in the mechanical properties at the high temperature.

Coefficient of Friction (COF): Testing Method

The COF measurements were carried out on a slip/peel SP-102C-3M90 unit from Instrumentors Inc. The COF value is calculated as follows:

Tractive Forces/Normal Forces=Meter Reading/Sled Weight.

The test was carried out by placing a sheet of Hammermill Tidal DP long grain paper (8.5×11—10M—S20/50) on the test bed and then securing a thin free standing sample film to an aluminum sled with the dimensions of 38 mm×53 mm. The test bed with dimensions of 15.25 cm×30.50 cm, then traveled at a rate of 12 in/min. The unit digitally recorded a tractive force for the static and kinetic component of the measurement which was then divided by the sled weight resulting in the static and kinetic COF values. The samples were tested at room temperature. ASTM D 1894 was used as a rough guide for carrying out the COF test.

TABLE 4

| | Coefficient of Friction at Room Temperature | |
|---|---|---|
| Sample | Static COF | Kinetic COF |
| Example 2 | 0.613 | 0.395 |
| Example 3 | 0.575 | 0.462 |
| Comparative Example 4 | >1.000 | 0.914 |
| Comparative Example 5 | 1.340 | 0.800 |

Table 4 shows that the presence of the fluorinated resin decreases the coefficient of friction of the fluorocarbon thermoplastic random copolymer compared to the fluorocarbon elastomer random copolymer and the fluorocarbon-silicone random copolymer.

Release Test

The test samples are employed to evaluate toner offset and release force characteristics when employed as an electrostatographic fuser member coating. Two 1-inch square pieces are cut from each example. One of these squares is left untreated with release agent (the dry sample). To the surface of the other sample is applied an unmeasured amount of Xerox aminofunctionalized PDMS 8R79.

Each sample is incubated overnight at a temperature of 175° C. Following this treatment, the surface of each sample is wiped with dichloromethane. Each sample is then soaked in dichloromethane for one hour and allowed to dry before off-line testing for toner offset and release properties.

Each sample is tested in the following manner:

A one-inch square of paper covered with unfused polyester toner is placed in contact with a sample on a bed heated to 175° C., and a pressure roller set for 80 psi is locked in place over the laminate to form a nip. After 20 minutes the roller is released from the laminate.

The extent of offset for each sample is determined by microscopic of the sample surface following delamination. The following numerical examination of corresponding to the amount of toner remaining on the surface, is employed.
1 0% offset
2 1–20% offset
3 21–50% offset
4 51–90% offset
5 91–100% offset Qualitative assessment of the force required for delamination of the follows:
1 low release force
2 moderate release force
3 high release force The results obtained are shown in Table 5.

TABLE 5

| Sample | Dry Offset | Dry Release | Amino Offset | Amino Release |
|---|---|---|---|---|
| Example 3 | 1 | 1 | 1 | 1 |
| Comparative Example 3 | 2 | 2 | 1 | 1 |

Table 5 shows a comparison between the compositions of the invention and a comparative example comprising a fluoroelastomer without the addition of zinc oxide. In terms of toner release and offset, the compositions of the invention show the significantly improved dry toner release and amino offset.

The above results show that the combination of zinc oxide, aminosiloxane and fluorinated resin in conjunction with the fluorocarbon thermoplastic random copolymer provide a composition having a combination of properties. Positive attributes such as increased lubricity and mechanical strength are maximized while negative attributes such as propensity to offset and lack of toner release are minimized.

The invention has been described in detail with particular reference to certain preferred embodiments thereof, but it should be appreciated that variations and modifications can be effected within the scope of the invention.

What is claimed is:

1. A method of preparing a composition containing a fluorocarbon thermoplastic random copolymer comprising the steps of:
   (a) providing a mixture having:
      (i) a fluorocarbon thermoplastic random copolymer having subunits of:

      —(CH$_2$CF$_2$)x—, —(CF$_2$CF(CF$_3$)y—, and —(CF$_2$CF$_2$)z—, wherein
      x is from 1 to 50 or 60 to 80 mole percent,
      y is from 10 to 90 mole percent,
      z is from 10 to 90 mole percent, and
      x+y+z equal 100 mole percent;
      (ii) a filler comprising zinc oxide;
      (iii) a curable amino functional polydimethyl siloxane copolymer comprising aminofunctional units selected from the group consisting of (aminoethylaminopropyl) methyl, (aminopropyl) methyl and (aminopropyl) dimethyl; and
      (iv) a bisphenol residue curing agent; and
   (b) curing the mixture for 3 to 10 hours at a temperature in the range of 220° C. to 280° C. and for an additional 2 to 10 hours a temperature in the range of 250° C. to 270° C.

2. The method of claim 1 wherein the amino functional polydimethyl siloxane copolymer comprises amino functional units selected from the group consisting of (aminoethylaminopropyl) methyl, (aminopropyl) methyl and (aminopropyl) dimethyl.

3. The method of claim 2 wherein the amino functional polydimethyl siloxane copolymer comprises amino function units selected from the group consisting of (aminoethylaminopropyl) methyl, (aminopropyl) methyl and (aminopropyl) dimethyl.

4. The method of claim 1 wherein the amino siloxane has a total concentration of from 1 to 20 parts by weight per 100 parts of the fluorocarbon thermoplastic random copolymer.

5. The method of claim 1 wherein the zinc oxide has a total concentration of from 1 to 20 parts by weight per 100 parts of the fluorocarbon thermoplastic random copolymer.

6. The method of claim 1 wherein the zinc oxide has a total concentration in the layer of from 3 to 15 parts by weight per 100 parts of the fluorocarbon thermoplastic random copolymer.

7. The method of claim 2 wherein the fluorocarbon thermoplastic random copolymer is cured by bisphenol residues.

8. The method of claim 1 wherein the fluorocarbon thermoplastic random copolymer is nucleophilic addition cured.

9. The method of claim 1 wherein x is from 30 to 50 mole percent, y is from 10 to 90 mole percent, and z is from 10 to 90 mole percent.

10. The method of claim 1 wherein x is from 40 to 50 mole percent and y is from 10 to 15 mole percent.

11. The method of claim 1 wherein z is greater than 40 mole percent.

12. The method of claim 1 wherein the fluorocarbon thermoplastic random copolymer further comprises a fluorinated resin.

13. The method of claim 12 wherein the fluorinated resin has a number average molecular weight of between 50,000 to 50,000,000.

14. The method of claim 12 wherein the ratio of fluorocarbon thermoplastic random copolymer to fluorinated resin is between 1:1 to 50:1.

15. The method of claim 12 wherein the fluorinated resin is polytetrafluoroethylene or fluoroethylenepropylene.

16. The method of claim 1 wherein the mixture is cured for 3 to 6 hours at a temperature in the range of 220° C. to 280° C. and for an additional 2 to 6 hours at a temperature in the range of 250° C. to 270° C.

17. The method of claim 1 wherein the mixture is cured for 3 to 6 hours at a temperature in the range of 220° C. to 270° C. and for an additional 2 to 6 hours at a temperature in the range of 250° C. to 260° C.

18. The method of claim 1 wherein the mixture is cured for 3 hours at a temperature of 270° C. and for an additional 2 hours at a temperature of 260° C.

19. A method of preparing a coating composition for a substrate comprising the steps of:
 a) providing a mixture having:
  i) a fluorocarbon thermoplastic random copolymer having subunits of:

—(CH$_2$CF$_2$)x—, —(CF$_2$CF(CF$_3$)y—, and —(CF$_2$CF$_2$)z—, wherein
   x is from 1 to 50 or 60 to 80 mole percent.
   y is from 10 to 90 mole percent,
   z is from 10 to 90 mole percent, and
   x+y+z equals 100 mole percent;
  ii) a filler comprising zinc oxide;
  iii) a curable amino functional polydirrethyi siloxane copolymer: comprising aminofunctional units selected from the group consisting of (aminoethylarninopropyl) methyl, (aminopropyl) methyl and (aminopropyl) dimethyl; and
  iv) a bisphenol residue curing agent;
 b) providing a substrate;
 c) coating the substrate with the composition in an organic solvent;
 d) allowing the composition to dry on the substrate at ambient or elevated temperatures; and
 e) curing the composition for 3 to 10 hours at a temperature in the range of 220° C. to 280° C. and for an additional 2 to 10 hours at a temperature in the range of 250° C. to 270° C.

* * * * *